Dec. 2, 1969 R. J. REILLY ET AL 3,481,351

CONTROL SYSTEMS

Filed Aug. 23, 1965 2 Sheets-Sheet 1

INVENTORS
RICHARD J. REILLY
NEIL C. SHER
BY
ATTORNEY

Dec. 2, 1969 R. J. REILLY ET AL 3,481,351

CONTROL SYSTEMS

Filed Aug. 23, 1965 2 Sheets-Sheet 2

INVENTORS
RICHARD J. REILLY
NEIL C. SHER

BY [signature]

ATTORNEY

United States Patent Office 3,481,351
Patented Dec. 2, 1969

3,481,351
CONTROL SYSTEMS

Richard J. Reilly and Neil C. Sher, St. Paul, Minn., assignors to Honeywell Inc., Minneapolis, Minn., a corporation of Delaware Filed Aug. 23, 1965, Ser. No. 481,674
Int. Cl. F15c *1/08*
U.S. Cl. 137—81.5 14 Claims

ABSTRACT OF THE DISCLOSURE

A fluidic annunciator system for monitoring the operation of unattended equipment, shutting down the equipment if an operating parameter associated therewith assumes an abnormal value, and providing a continuing indication of the first parameter to become abnormal. The system comprises a circuit for each monitored parameter, each circuit including bistable indicator means. Indication of the first parameter to become abnormal is accomplished by interrupting the power of all of the circuits when any parameter becomes abnormal. Start and test functions are also provided.

Figure 1A:
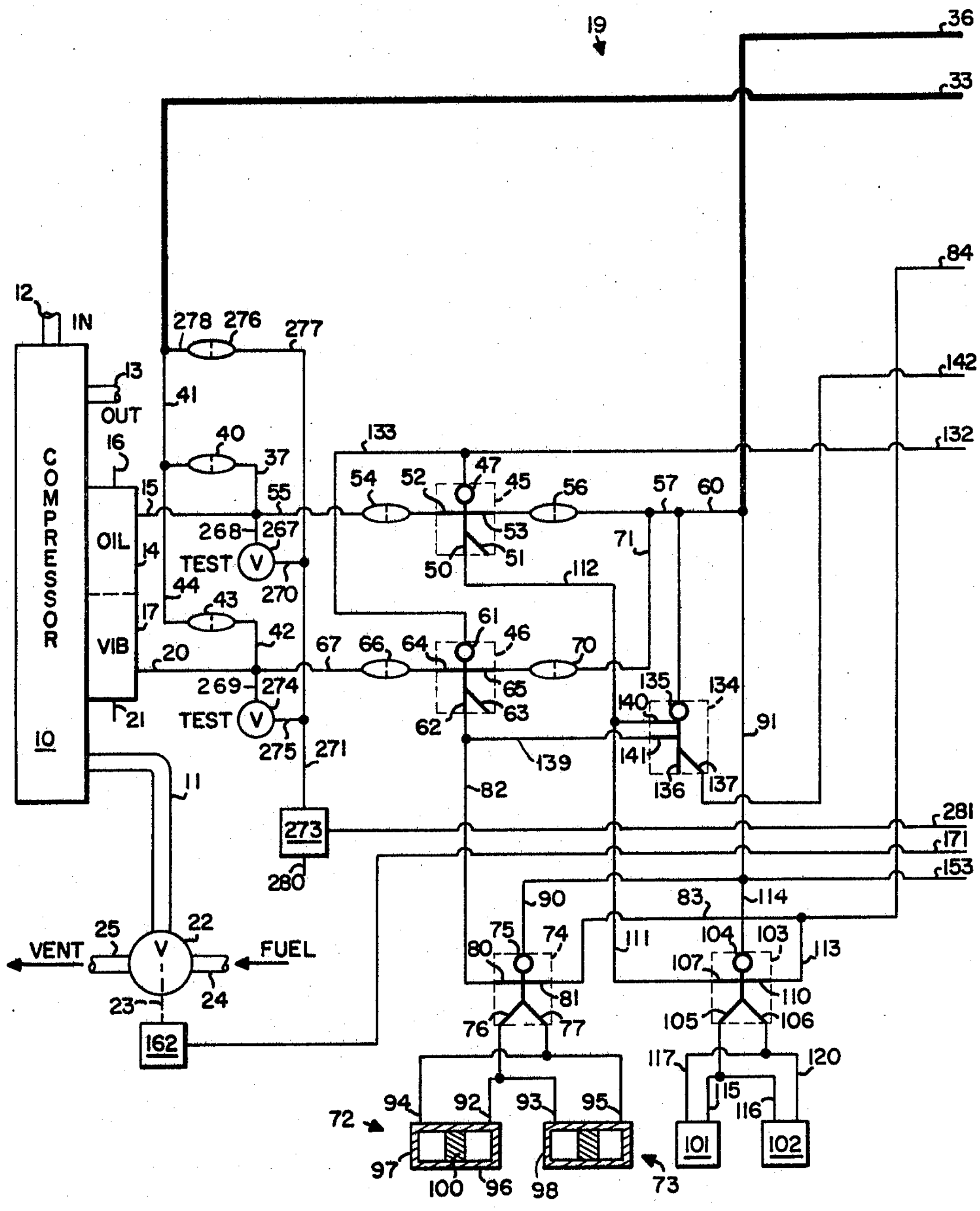

This invention relates to the field of supervisory systems, and more particularly to pure-fluid systems for monitoring and controlling the operation of unattended apparatus having a number of related parameters each of which normally varies within a range of values, but any of which may assume an extreme value calling for shutdown of the apparatus until the factor causing the excessive parameter value has been corrected. Although the invention is of general utility, it is disclosed for purposes of illustration as applied to a compressor including a heat engine driving a fluid pump.

In such a system the oil pressure, cooling water temperature, discharge pressure, and engine vibration, as well as other parameters, all vary within known ranges during proper system operation. On the other hand, the assumption of an extreme value by any of these parameters is premonitory of system failure and calls for shutdown of the system to avoid damage to expensive equipment. When the apparatus is unattended the shutdown must be accomplished automatically. Moreover, when maintenance personnel arrive to restore system operation, their work is greatly facilitated by the presence of some indication of which parameter was responsible for the shutdown, so that the need for repair is localized and only a portion of the system needs to be investigated. Although a single parameter is usually responsible for any particular shutdown, it generally occurs that during the shutdown other parameters assume extreme values. It is thus desirable to provide means indicating which parameter was the first to fail, that is, to assume an extreme value, while preventing indication of failures subsequent thereto.

The apparatus described below includes means for giving the particular indication just described, together with means facilitating the starting, testing, and intentional shutdown of the equipment. The system disclosed is substantially a pure-fluid system. That is, almost all functions are accomplished by control of fluid flow. Only a very few moving mechanical parts are used and these are parts of the apparatus to be controlled, or are manually actuated components.

A principal object of the invention is to provide an improved supervisory system for apparatus having a plurality of parameters, any of which may assume an abnormal value. Another object of the invention is to provide a pure fluid supervisory system for such apparatus. A further object of the invention is to provide pure fluid means for giving a continuing indication of which of a plurality of such parameters first exceeded its normal range of values. A further broad object of the invention is to provide such a system in which transient abnormal values of various parameters, assumed temporarily during starting or testing of the system, are prevented from operating to shut the system down.

Various other objects, advantages, and features of novelty which characterize the invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which there is illustrated and described a preferred embodiment of the invention.

Figure 1B:
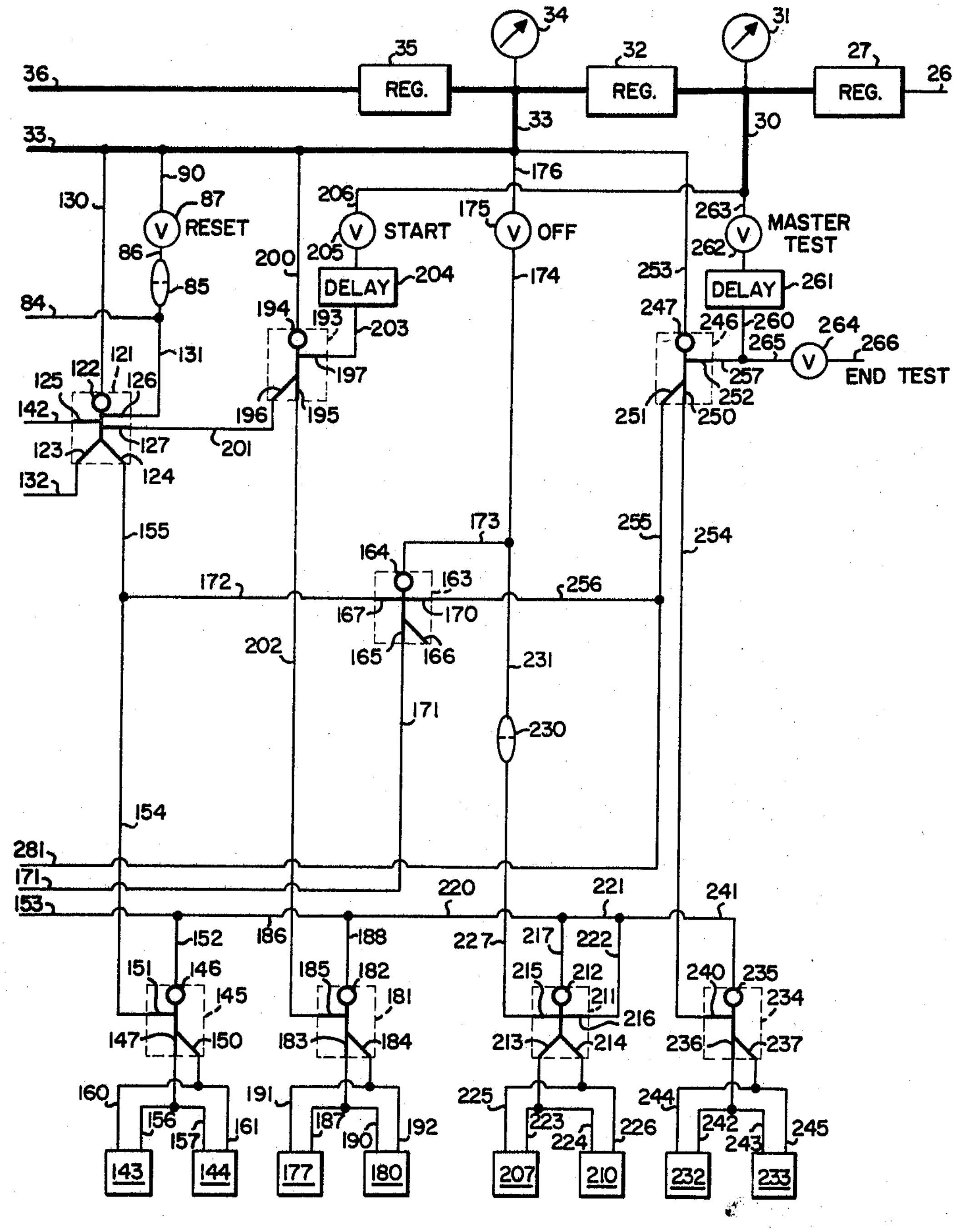

The single figure of the drawing, including two sheets identified as FIGURES 1A and 1B, shows the invention schematically as applied in the natural gas industry to a compressor system. The system is simplified for ease in comprehension to show only two variable parameters being supervised.

In the figure, a compressor is identified by reference numeral 10 and comprises a heat engine energized with fuel through conduit 11, and a pump taking gas in through conduit 12 and discharging gas at a higher pressure through conduit 13.

Associated with compressor 10 is an oil pressure sensor 14 which opens a passageway between a first sensing conduit 15 and an exhaust conduit 16 if the oil pressure falls below a predetermined value. Also associated with compressor 10 is a vibration sensor 17 which opens a passageway between a second sensing conduit 20 and an exhaust conduit 21 if the vibration of the engine becomes excessive. Flow of fuel to the engine takes place under the control of a main fuel valve 22 which may be actuated, by a suitable mechanical or hydraulic drive 23, between a first position, in which fuel from a suitable source not shown is admitted through conduit 24 to conduit 11, and a second position, in which the flow of fuel to conduit 11 is cut off and the engine is vented through conduit 25. It is often the case that the gas supplied to conduit 24 as fuel also constitutes the fluid which is pumped through conduits 12 and 13. All the elements so far described are known in the art and their details do not relate to the present invention.

For supervising the operation of compressor 10 there is shown a fluid actuated system 19 which is powered from a conduit 26 transmitting filtered pressure fluid to a first regulator 27 to supply a high pressure manifold 30 with fluid at a pressure of 30 pounds per square inch, as indicated by a first gauge 31. A second regulator 32 connected to manifold 30 is operative to supply a medium pressure manifold 33 with fluid at a pressure of 15 pounds per square inch, as indicated by a second gauge 34. A third regulator 35 connected to manifold 33 is operative to supply a low pressure manifold 36 with fluid at a pressure of 2 pounds per square inch. Manifolds 30, 33, and 36 are represented in the drawing by heavy lines. Symbols conventional in electrical circuitry are resorted to in the drawing to distinguish between instances where conduits interconnect and instances where they cross without interconnection.

Conduit 15 of pressure sensor 14 is connected through conduit 37, orifice 40, and conduit 41 to medium pressure manifold 33. Conduit 20 of vibration sensor 17 is connected through conduit 42, orifice 43, and conduits 44 and 41 to medium pressure manifold 33.

The input to system 19 from sensors 14 and 17 is supplied through a pair of fluid amplifiers 45 and 46. Amplifier 45 is shown to comprise a power nozzle 47, a preferred outlet port 50, a second outlet port 51, a first control port 52 for causing the stream from the power nozzle to emerge through outlet port 51, and a second control port 53 for causing the stream to emerge through outlet port 50. Control port 52 is connected through an orifice 54 and conduit 55 to conduits 15 and 37. Control port 53 is connected through an orifice 56 and conduits 57 and 60 to low pressure manifold 36. Port 51 empties into a common fluid return, not shown.

Amplifier 46 is shown to comprise a power nozzle 61, a preferred outlet port 62, a second outlet port 63, a first control port 64 for causing the stream from the power nozzle to emerge through outlet port 63, and a second control port 65 for causing the stream to emerge through port 62. Control port 64 is connected through an orifice 66 and conduit 67 to conduits 20 and 42. Control port 65 is connected through an orifice 70 and conduits 71, 57 and 60 to low pressure manifold 36. Port 63 empties into the common fluid return.

Amplifier 46 operates to control a pair of indicators 72 and 73 through a fluid amplifier 74 having a power nozzle 75, a pair of outlet ports 76 and 77, a first control port 80 for causing the stream from the power nozzle to emerge through port 77, and a second control port 81 for causing the stream to emerge through port 76. Control port 80 is connected through conduit 82 to outlet port 62 of amplifier 46. Control port 81 may be connected through conduits 83 and 84, an orifice 85, conduit 86, a RESET valve 87, and conduit 90 to medium pressure manifold 33. Valve 87 is normally closed, but may be opened momentarily by manual operation to complete the connection to manifold 33 as long as the valve is actuated. Power nozzle 75 of amplifier 74 is connected through conduits 90 and 91 to low pressure manifold 36.

Outlet port 76 is connected through conduits 92 and 93 to indicators 72 and 73, and outlet port 77 is connected through conduits 94 and 95 to indicators 72 and 73, all respectively. Indicators 72 and 73 are structurally identical and only the former will be described in detail. Indicator 72 comprises a housing 96 defining a cylindrical chamber having a piston or spool slideably enclosed therewithin. One end 97 of housing 96 is transparent. Conduit 94 communicates with the inside of housing 96 adjacent end 97, and conduit 92 communicates with the inside of housing 96 adjacent its other end. The face of spool 100 nearest to end 97 is conspicuously colored. Similarly conduit 93 communicates with the inside of the housing of indicator 73 near its transparent end 98, and conduit 95 communicates with the inside of the housing near its opposite end.

Amplifier 45 operates to control a pair of indicators 101 and 102, like indicators 73 and 72, through a fluid amplifier 103 having a power nozzle 104, a pair of outlet ports 105 and 106, a first control port 107 for causing the stream from the power nozzle to emerge through port 106, and a second control port 110 for causing the stream to emerge through port 105. Control port 107 is connected through conduits 111 and 112 to outlet port 50 of amplifier 45. Control port 110 is connected through conduits 113 and 84, orifice 85, and conduit 86 to RESET valve 87. Power nozzle 104 is connected through conduits 114 and 91 to low pressure manifold 36.

Outlet port 105 is connected through conduits 115 and 116 to indicators 101 and 102, and outlet port 106 is connected through conduits 117 and 120 to indicators 101 and 102, all respectively.

Power fluid is supplied to the nozzles of amplifiers 45 and 46 from a further fluid amplifier 121 having a power nozzle 122, a pair of outlet ports 123 and 124, a first control port 125 for causing the stream from the power nozzle to emerge through port 124, and a pair of further control ports 126 and 127 for causing the stream to emerge through port 123. Nozzle 122 is connected through conduit 130 to medium pressure manifold 33. Control port 126 is connected through conduit 131, orifice 85, and conduit 86 to RESET valve 87. Outlet port 123 is connected through conduit 132 to nozzle 47 of amplifier 45. Conduit 132 is extended by means of conduit 133 to nozzle 61 of amplifier 46.

To prevent more than the first failure from reaching indicators 72, 73, 101 and 102, a further fluid amplifier 134 is provided, having a power nozzle 135, a preferred outlet port 136, a second outlet port 137, and first and second control ports 140 and 141 for individually causing the stream from the power nozzle to emerge through port 137. Port 136 empties into the common return. Control port 140 is connected through conduit 112 to port 50 of amplifier 45. Port 141 is connected through conduit 139 to port 62 of amplifier 46. Port 137 is connected through conduit 142 to control port 125 of amplifier 121.

Indicators 72 and 73 are associated with operation of sensor 17 and indicators 101 and 102 are associated with the operation of sensor 14. A further set of indicators 143 and 144 are provided to indicate the condition of the system as a whole. These indicators are like indicators 72 and 73, and are operated by a fluid amplifier 145 having a power nozzle 146, a preferred outlet port 147, a second outlet port 150, and a control port 151 for causing the stream from the power nozzle to emerge through port 150.

Power nozzle 146 is connected to low pressure manifold 36 through conduits 152, 153 and 91. Control port 151 is connected through conduits 154 and 155 to outlet port 124 of amplifier 121. Outlet port 147 is connected through conduits 156 and 157 to indicators 143 and 144, and outlet port 150 is connected through conduits 160 and 161 to indicators 143 and 144, all respectively.

Control of main fuel valve 22 is accomplished by a pilot valve 162 under the control of a fluid amplifier 163 comprising a power nozzle 164, a preferred outlet port 165, a second outlet port 166, a first control port 167 for causing the stream from the power nozzle to emerge through outlet port 166, and a second control port 170 for causing the stream to emerge through outlet port 165. Port 165 is connected through a conduit 171 to pilot valve 162. Outlet port 166 empties into the common return. Control port 167 is connected through conduits 172 and 155 to outlet port 124 of amplifier 121. Power nozzle 164 is connected through conduits 173 and 174, an OFF valve 175, and conduit 176, to medium pressure manifold 33. During operation of the system, valve 175 remains open.

During starting, as well as shutdown, of the system the parameters being sensed may temporarily assume excessive values, which would normally shut the system down before it became fully operative. Special starting means to avoid this are provided and include a pair of indicators 177 and 180 like indicators 72 and 73, controlled by a fluid amplifier 181 having a power nozzle 182, a preferred outlet port 183, a second outlet port 184, and a control port 185 for causing the stream from the power nozzle to emerge through port 184. Power nozzle 182 is connected through conduits 188, 186, 153 and 91 to low pressure manifold 36. Outlet 183 is connected through conduits 187 and 190 to indicators 177 and 180, and outlet port 184 is connected through conduits 191 and 192 to indicators 177 and 180, all respectively.

Also included in the special starting means is further fluid amplifier 193 having a power nozzle 194. a preferred outlet port 195, a second outlet port 196, and a control port 197 for causing the stream from the power nozzle to emerge through port 196. Power nozzle 194 is connected through conduit 200 to medium pressure manifold 33. Outlet port 196 is connected through conduit 201 to control port 127 of amplifier 121. Outlet port 195 is connected through conduit 202 to control port 185 of amplifier 181. Control port 197 may be connected through conduit 203, a delay device 204, a START valve 205 and conduit 206 to high pressure manifold 30. Valve 205 is a normally closed, momentarily operable valve like valve 87. Delay device 204 comprises a chamber of predetermined volume having a large inlet orifice and a small outlet orifice, so that the chamber fills rapidly and empties slowly.

Special apparatus for intentionally shutting down the system includes a pair of indicators 207 and 210, like indicators 72 and 73, controlled by a fluid amplifier 211 having a power nozzle 212, a pair of outlet ports 213 and 214, a first control port 215 for causing the stream from the power nozzle to emerge through port 214, and a second control port 216 for causing the stream to emerge through port 213. Power nozzle 212 is connected through conduits 217, 220, 186, 153 and 91 to low pressure manifold 36. Conduit 220 is also continued through conduits 221 and 222 to control port 216. Outlet port 213 is connected through conduits 223 and 224 to indicators 207 and 210, and outlet port 214 is connected through conduits 225 and 226 to indicators 207 and 210, all respectively. Control port 215 is connected to OFF valve 175 through conduit 227, an orifice 230, and conduits 231 and 174.

It is desirable to be able to determine at any time whether the system is in proper operation, and further special test means are provided for this purpose. The special test means includes a pair of indicators 232 and 233, like indicators 72 and 73, controlled by a fluid amplifier 234 having a power nozzle 235, a preferred outlet port 236, a second outlet port 237, and a control port 240 for causing the stream from the power nozzle to emerge through port 237. Power nozzle 235 is connected through conduits 241, 221, 220, 186, 153, and 91 to low pressure manifold 36. Outlet port 236 is connected through conduits 242 and 243 to indicators 232 and 233 and outlet port 237 is connected through conduits 244 and 245 to indicators 232 and 233, all respectively.

Also included in the special test means is a fluid amplifier 246 having a power nozzle 247, a preferred outlet port 250, a second outlet port 251, and a control port 252 for causing the stream from the power nozzle to emerge through port 251. Power nozzle 247 is connected through conduit 253 to medium pressure manifold 33. Outlet port 250 is connected through conduit 254 to control port 240 of amplifier 234. Outlet port 251 is connected through conduits 255 and 256 to control port 170 of amplifier 163. Control port 252 may be connected through conduits 257 and 260, a delay device 261 like device 204, a MASTER TEST valve 262 and conduit 263 to high pressure manifold 30. Valve 262 is a normally closed, momentarily actuable valve like valve 87. A further END TEST valve 264 is connected between conduits 257 and 260 by conduit 265. Valve 264 is normally closed but may be opened to discharge the fluid in conduits 257 and 260 through an outlet 266.

In addition to MASTER TEST valve 262, individual normally closed, momentarily actuable TEST valves 267 and 274 like valve 87 are provided at the input to the system. One side of TEST valve 267 is connected through conduits 268, to conduits 15, 37, and 55; the other side is connected through conduit 270 and a dump manifold 271 to a dump valve 273. Similarly one side of TEST valve 274 is connected through conduit 269 to conduits 20, 42, and 67, and the other side is connected through conduit 275 to dump manifold 271. An additional connection is made from medium pressure manifold 33 through conduit 278, orifice 276, and conduit 277 to dump manifold 271. Valve 273 is normally closed, but may be operated to discharge the fluid in manifold 271 through an outlet 280. Valve 273 is connected through conduits 281 and 255 to outlet port 251 of amplifier 246.

OPERATION

In the normal operating condition of this system conduit 26 is connected to a source of pressure fluid and conduit 24 is connected to a source of fuel. Valves 264, 267 and 274 are closed. Manifolds 30, 33 and 36 supply fluid at their respective regulated pressures. Fuel valve 22 is positioned to admit fuel to the engine through conduit 11 when the engine is operating properly. The oil pressure is sufficiently high and the vibration level is sufficiently low that conduits 15 and 20 are not connected to conduits 16 and 21 respectively, and fluid flows from medium pressure manifold 33 through orifices 40 and 54 to supply a fluid signal at control port 52, and through orifices 43 and 66 to supply a fluid signal at control port 64. Fluid also flows from low pressure manifold 36 through orifice 56 to produce a fluid signal at control port 53 and through orifice 70 to produce a fluid signal at control port 65. These signals are considerably smaller than those at ports 52 and 64 so that the streams emerge from amplifiers 45 and 46 through ports 51 and 63 respectively. Thus, no signals are supplied to control ports 140 and 141 of amplifier 134. The fluid supplied to nozzle 135 from manifold 36 accordingly emerges through port 136 and no signal is supplied to control port 125 of amplifier 121.

Fluid from manifold 33 is supplied to nozzle 194 of amplifier 193, but when no signal is supplied to control port 197 the fluid emerges from port 195 and consequently no signal is supplied to control port 127 of amplifier 121. Valve 87 is closed and no signal is supplied to control port 126. It should, however, be noted that amplifier 121 is bistable. In normal operation, the last control signal received by amplifier 121 was supplied to control port 126 or 127 through RESET valve 87 or START valve 205. Hence, the fluid supplied to nozzle 122 emerges through port 123 to supply amplifiers 45 and 46.

Fluid from manifold 33 is supplied to nozzle 247 of amplifier 246, but valve 262 is closed and no signal is supplied to control port 252, so that the fluid emerges from port 250 and no signal is supplied to control port 170 of amplifier 163. Normally no signal is supplied to control port 167 from amplifier 121, therefore the fluid supplied to nozzle 164 from manifold 33 through valve 175, which is open, emerges through port 165 and operates pilot valve 162. This results in a continuing supply of fuel to the engine.

Fluid from manifold 33 passes through orifice 276 and the pressure in dump manifold 271 is equal to that in manifold 33. No signals are present at control ports 80, 81, 107 or 110 of amplifiers 74 or 103. However, amplifiers 74 and 103 are bistable and the last control signals received thereby were supplied to control ports 81 and 110 from RESET valve 87 through conduit 84. Thus, fluid supplied from manifold 36 to the nozzles of amplifiers 74 and 103 emerges from ports 76 and 105 respectively. No signal is present at control port 151, but signals are present at control ports 185, 215, 216, and 240, that at port 215 being greater than that at port 216.

Thus fluid supplied from manifold 36 to the nozzles of amplifiers 145, 181, 211 and 234 emerges from ports 147, 184, 214 and 237 respectively.

Fluid from port 76 acts through conduit 92 to displace spool 100 to the left, bringing its conspicuously painted end close to the transparent end of housing 96 to give a visible NORMAL indication. Fluid from port 76 also acts through conduit 93 to displace the spool of indicator 73 away from the transparent end of the housing, so that no FAIL indication is visible. In this same way indicators 101, 143, 180, 210, and 233 all give visible NORMAL indications, and indicators 102, 144, 177, 207 and 232 give no visible indications.

Now if the vibration level of the compressor rises above a predetermined value, conduit 20 is connected to conduit 21 and the pressure in conduit 67 drops substantially to zero. Port 62 is preferred, so that the stream tends to revert to port 62. The small pressure at control port 65 acts to insure switching of the stream in amplifier 46. Accordingly a fluid signal now appears at each of control ports 141 and 80. The latter signal transfers the flow in amplifier 74 from port 76 to port 77. Spool 100 is now displaced to the right, rendering its indication no longer visible, and the spool in indicator 73 is simultaneously displaced to the left to give a visible FAIL indication. Indicators 101 and 102 are unaffected.

The flow in amplifier 134 is transferred from port 136 to port 137, and a fluid signal is supplied to control port 125 of amplifier 121, transferring the flow in that amplifier from port 123 to port 124, and supplying a fluid signal to each of control ports 167 and 151. The latter withdraws the normal indication at 143 and displays a FAIL indication at 144. The former transfers the flow in amplifier 163 from port 165 to port 166, thus removing the signal from pilot valve 162, which accordingly operates valve 22 so as to shut off the fuel to the engine.

It should be noted that transfer of flow in amplifier 121 also interrupts the supply of fluid to the power nozzle of amplifier 46, and also to the power nozzle of amplifier 45. Thus, as the compressor comes to a stop the oil pressure drops to a point where the signal at control port 52 disappears, but there is no power flow to be switched and hence no change in indicators 101 and 102 can take place.

If the initial failure is due to low oil pressure rather than to excessive vibration, conduit 15 is connected to conduit 16 and the pressure in conduit 55 drops substantially to zero. Port 50 is preferred, so that the stream tends to revert to port 50. The small pressure at control port 53 acts to insure switching of the stream in amplifier 45. Accordingly a fluid signal now appears at each of control ports 140 and 107. The latter signal transfers the flow in amplifier 103 from port 105 to port 106. This causes the NORMAL indication to disappear at 101 and causes a FAIL signal to appear at 102. Indicators 72 and 73 are not affected. Operation of amplifier 134 occurs as before, with the effect of removing the NORMAL signal at 143 and producing a FAIL signal at 144, as well as shutting off the supply of fluid to the power nozzle of amplifier 45, and also to the power nozzle of amplifier 46. The compressor is again shut down, but concomitant transient excessive vibration is prevented from affecting indicators 72 and 73.

Indicators 143 and 144 may be remotely located at a central maintenance point, or the failure indication may be telemetered to such a point in any conventional manner. However this may be done, maintenance personnel come to the compressor to restore its operation, and indications 72, 73, 101 and 102 inform them that the cause of the shutdown was excessive engine vibration, in the first case, or low oil pressure, in the second case, thus materially shortening the task of locating and correcting the cause of the shutdown. After it is repaired, operation of the system is restored by momentarily opening the START valve 205. Fluid from high pressure manifold 30 is admitted to delay device 204 and is trapped there when 205 closes. The volume of device 204 and the size of the orifice connected to conduit 203 are such that a fluid signal sufficient to control amplifier 193 is supplied to control port 197 for a predetermined interval of from three to five minutes. The stream in amplifier 193 is transferred from port 195 to port 196, thus removing the signal from control port 185 of amplifier 181. The NORMAL indication at 180 disappears and a START indication appears at 177.

A signal is also supplied through conduit 201 to control port 127 of amplifier 121. This signal is greater than any signal which can appear at control port 125. The stream from power nozzle 122 is transferred from port 124 to port 123. This removes the fluid signals from control port 167 of amplifier 163 and control port 151 of amplifier 145.

The fluid stream in amplifier 163 returns to the preferred outlet port 165 and hence energizes pilot valve 162 to open main fuel valve 22, so that with a conventional ignition arrangement the engine again begins to operate. The fluid stream in amplifier 145 likewise returns to the preferred outlet port 147, causing the FAIL indication at 144 to disappear and a NORMAL indication appear at 143.

Power fluid is now supplied to nozzles 47 and 61 of amplifiers 45 and 46, but during the starting up of the compressor the oil pressure may at first be too low or the vibration level may have transient excessive values. Thus during this interval the stream from power nozzles 47 may emerge from port 50 or port 51, so that amplifier 103 may cause either a NORMAL indication at 101 or a FAIL indication at 102. Similarly the stream from power nozzle 61 may emerge either from port 62 or port 63 so that amplifier 74 may cause either a NORMAL indication at 72 or a FAIL indication at 73.

The stream from the power nozzle of amplifier 134 may emerge from either port 136 or port 137, so that a fluid signal may or may not be present at control port 125 of amplifier 121. However, as long as the signal at control port 127 continues, the lesser signal at control port 125 is incapable of affecting amplifier 121, and no shutoff signal is supplied through port 124 to amplifier 163. If the system is performing satisfactorily, the operation of the compressor stabilizes with continuous signals at control ports 52 and 64, and continuous NORMAL indications at 72 and 101.

Presently the signal at control port 197 disappears as the delay device 204 becomes empty, and the fluid stream in amplifier 193 returns to preferred outlet port 195. The overriding signal at control port 127 is removed, so that any subsequent failure of the compressor may have the desired indicating and shutdown effect. The signal is returned to control port 185 so that the START indication at 177 disappears and a NORMAL indication appears at 180.

Even when no failure has occurred, periodic maintenance checks must be made of the installation, and it is desirable to be sure that the several monitoring channels are in satisfactory operating condition. TEST valves 267 and 274 are provided for this purpose. However, it is essential that no inadvertent operation of these valves be permitted to be effective, since without the special provisions about to be described, such inadvertent operation would cause unintended shutdown of the system. Systems of this type are usually interconnected in a network having a most efficient interrelationship, so that shutdowns are expensive and can only be justified to save even more expensive damage to equipment.

During system operation the pressure in dump manifold 271 is the same as that in conduits 15 and 20 when the oil pressure and vibration level are within their permissible ranges. Thus opening of TEST valve 267 or TEST valve 274 brings about no change in the system. When it is desired to make a test, it is first necessary to open MASTER TEST valve 262 filling delay device 261 and trapping fluid therein as described in connection with device 204. The function of this device is to provide a fluid signal to prevent anything in the test procedure from shutting off the engine, and hence it must be effective for the normal period required to perform the test routine, a matter of from five to ten minutes. Device 261 is thus roughly twice as large as device 204.

A fluid signal appears at control port 252 and transfers the flow in amplifier 246 from port 250 to port 251. The signal is removed from control port 240 and amplifier 234 operates to cause the NORMAL indication to disappear at 233 and to cause a TEST indication to appear at 232. As long as the TEST indication is visible normal supervisory operation is not being exercised by the system.

A signal from port 251 appears at control port 170 of amplifier 163 and acts in a direction to maintain the stream of amplifier 163 in its preferred outlet port. By this means any signal from amplifier 121 is prevented from causing pilot valve 162 to shut down the engine. At the same time a signal is supplied through conduit 281 to dump valve 273, which connects dump manifold 271 to outlet conduit 280. Now if TEST valve 267, for example, is operated, the pressure in conduit 55 drops to zero, as it would if sensor 14 had detected a low oil pressure, and amplifier 45 supplies signals to amplifiers 103 and 134. The former causes a FAIL indication to appear at 102 and causes the NORMAL indication to disappear at 101. The latter supplies a signal to control port 125 which shuts off the supply of fluid to nozzles 47 and 61, and supplies a signal to amplifiers 163 and 145. Amplifier 163 is disabled by the signal at control port 170, but amplifier 145 operates to cause the NORMAL signal at 143 to disappear and to cause a FAIL signal to appear at 144. Subsequent operation of test valve 274 can have no effect on indicators 72 and 73 since there is no fluid flow in amplifier 46.

When the test is completed it is necessary to restore operation of this system. This is accomplished by briefly opening RESET valve 87, which supplies a fluid signal to control port 126 of amplifier 121 and to control ports 81 and 110 of amplifiers 74 and 103. Amplifier 121 removes the signal from control port 151, causing the FAIL indication at 144 to disappear and causing a NORMAL signal to appear at 143, and commences supplying fluid to the power nozzles of amplifiers 45 and 46. Amplifier 74 is unaffected. Amplifier 103 again causes a NORMAL indication at 101 and removes the FAIL indication at 102.

It will be appreciated that TEST valve 274 can be operated first, rather than test valve 267. In this case operation of amplifiers 46 and 74 and indicators 72 and 73, rather than amplifiers 45 and 103 and indicators 101 and 102, is primarily checked, and after the FAIL indication appears at 73 subsequent operation of test valve 267 should have no effect on indicators 101 and 102. Either test checks amplifiers 134, 121 and 145 and indicators 143 and 144.

It is desirable to terminate the TEST mode of operation of the system as soon as possible, to restore automatic supervision of the oil pressure and vibration level. This termination occurs automatically when the pressure in delay device 261 reaches zero, but can be brought about at any time by opening valve 264, thus removing the fluid signal at control port 252. Valve 264 must be closed after device 261 becomes empty.

Removal of the signal at control port 252 allows the stream in amplifier 246 to return to preferred port 250, thus removing the overriding signal at control port 170 of amplifier 163 and simultaneously disabling dump valve 273. Amplifier 234 is supplied with a signal at control port 240 to cause the TEST indication at 232 to disappear and to cause the NORMAL indication to reappear at 233.

We claim as our invention:

1. In an annunciator system, in combination: monostable fluid switching means having outlet ports, control ports, and power inlets; bistable fluid switching means having first and second stable states; means including said bistable fluid switching means in the first stable state thereof for connecting said power inlets to a fluid power source; condition responsive fluid signal means having signal ports at which fluid signals appear when the conditions assume abnormal values; means connecting said control ports severally to said signal ports, so that, when the conditions assume said abnormal values, fluid signals appear at predetermined outlet ports of said monostable fluid switching means; fluid actuated means having first stable states; further bistable fluid switching means connected to said fluid actuated means and to said predetermined outlet ports for actuating said fluid actuated means into said first stable states upon reception of fluid signals; and means connecting said predetermined outlet ports to the first named bistable fluid switching means to cause operation thereof, in response to a fluid signal at any one of said predetermined outlet ports, to the second stable state thereof in which said power inlets are disconnected from said source.

2. The system of claim 1 together with means connected to said first named bistable fluid switching means for causing actuation thereof into said first stable state.

3. The system of claim 2 together with manually operable means connected to said monostable fluid switching means for interrupting the fluid signals supplied the control ports thereof, thereby testing said system by causing actuation of said fluid actuated means into said first stable states.

4. An annunciator system comprising: pure fluid alarm sensing means giving fluid signals when the values of a plurality of variables become abnormal; fluid signal responsive indicating means; means connecting said sensing means to said indicating means; means actuable by a fluid signal out of a first condition, in which fluid is supplied to said sensing means, and into a second condition in which fluid is cut off from said sensing means; and further means connecting said alarm sensing means to the last named means.

5. The combination according to claim 4 together with reset means connected to said indicating means and to the fluid actuable means.

6. The combination according to claim 5 together with manually operable means connected to the fluid actuable means for preventing operation of the system during a predetermined interval.

7. The combination according to claim 6 together with utilization means having a plurality of variables to be monitored by said alarm sensing means.

8. An annunciator system comprising: alarm sensing means including normally fluid powered monostable elements giving fluid signals when the values of a plurality of variables have become abnormal; fluid signal responsive indicating means; means connecting said sensing means to said indicating means; fluid bistable means controlling the power to said monstable elements in said alarm sensing means; and means connecting said fluid bistable means to said sensing means so that, said alarm sensing means is rendered inoperative in response to a signal from said alarm sensing means.

9. Supervisory apparatus comprising, in combination: a source of continuous fluid power; a power conduit; controllable means normally supplying power from said source to said conduit; signal actuation indicating means; sensing means supplying outputs upon deviation of a plurality of variable quantities beyond respective predetermined values; further means connected to said conduit, said indicating means, and said sensing means and energized from said conduit to supply signals to said indicating means in accordance with said outputs; and means in said further means, connected to said controllable means for causing interruption of the supply of fluid power to said conduit when one of said variable quantities deviates beyond a predetermined value.

10. An annunciator system comprising: sensing means including a plurality of normally fluid powered monostable elements, each responsive to a fail condition; means for indicating fail conditions; means connecting said sensing means to the indicating means; fluid amplifier bistable switching means; means connecting said switching means to said monostable elements, said bistable switching means, in response to a fluid signal from said sensing means, interrupting the power to said sensing means; and control means connected to said switching means.

11. An annunciator system comprising, in combination: means having a plurality of variables to be monitored; sensing means for giving a fluid signal when one of said variables has become abnormal; indicating means; means connecting said indicating means to said sensing means; fluid amplifier bistable means for controlling power to said sensing means; and control means connecting said sensing means to control said bistable means.

12. The combination according to claim 11 together with shutdown means connected to the fluid amplifier bistable means.

13. The combination according to claim 12 together with fluid supply power means; and means connecting said power means to the sensing means, the fluid indicating means, the bistable means, and the shutdown means.

14. An annunciator system comprising:

sensing means operable, when supplied with fluid power, to produce a fluid alarm signal for each of a plurality of variables sensed thereby which assumes an abnormal value;

supply means having an inlet adapted to be connected to a fluid power source, an outlet and control port means, said supply means operable to provide a fluid output from the outlet only in the absence of a fluid signal at the control port means;

means connecting the outlet of said supply means to said sensing means so as to supply fluid power thereto;

bistable indicators, each having an alarm signal inlet, each operable to assume a first stable state in response to a fluid signal at its alarm signal inlet; and means connecting said sensing means to the control port means of said supply means and to the alarm signal inlets of said bistable indicators.

References Cited

UNITED STATES PATENTS

| | | | |
|---|---|---|---|
| 569,445 | 10/1896 | Bonta | 137—26 |
| 1,934,631 | 11/1933 | Taylor | 137—26 |
| 3,199,523 | 8/1965 | McEathron | 137—26 |
| 3,216,409 | 11/1965 | Puster | 137—26 XR |
| 3,250,285 | 5/1966 | Vockroth | 137—81.5 |
| 3,253,605 | 5/1966 | Grubb | 137—81.5 |
| 3,260,271 | 7/1966 | Katz | 137—81.5 XR |
| 3,338,515 | 8/1967 | Dexter | 137—81.5 XR |
| 3,342,197 | 9/1967 | Phillips | 137—81.5 |
| 3,264,613 | 8/1966 | Stolle | 340—223 XR |
| 3,287,717 | 11/1966 | Kraus | 340—223 XR |

SAMUEL SCOTT, Primary Examiner